United States Patent
Agarwal et al.

(10) Patent No.: US 8,730,930 B2
(45) Date of Patent: May 20, 2014

(54) POLLING USING B-ACK FOR OCCASIONAL BACK-CHANNEL TRAFFIC IN VOWIFI APPLICATIONS

(75) Inventors: Peyush Agarwal, Milpitas, CA (US); Joachim S. Hammerschmidt, Mountain View, CA (US); Yasantha N. Rajakarunanayake, San Ramon, CA (US); Praveen K. Gopala, Sunnyvale, CA (US); George Kondylis, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 214 days.

(21) Appl. No.: 13/181,112

(22) Filed: Jul. 12, 2011

(65) Prior Publication Data
US 2012/0307814 A1    Dec. 6, 2012

Related U.S. Application Data

(60) Provisional application No. 61/491,838, filed on May 31, 2011.

(51) Int. Cl.
*H04W 4/00* (2009.01)
*H04W 72/12* (2009.01)

(52) U.S. Cl.
CPC ...... *H04W 72/1278* (2013.01); *H04W 72/1242* (2013.01); *H04W 72/1268* (2013.01); *H04W 72/12* (2013.01)
USPC .......................................................... 370/338

(58) Field of Classification Search
CPC ................................................ H04W 72/1278
USPC .......................................................... 370/338
See application file for complete search history.

(56) References Cited

U.S. PATENT DOCUMENTS

| | | | |
|---|---|---|---|
| 2002/0163933 A1* | 11/2002 | Benveniste | 370/465 |
| 2005/0025176 A1* | 2/2005 | Ko et al. | 370/448 |
| 2008/0049771 A1* | 2/2008 | Acharya et al. | 370/408 |
| 2011/0090855 A1* | 4/2011 | Kim | 370/329 |
| 2011/0158159 A1* | 6/2011 | Gong et al. | 370/328 |

* cited by examiner

*Primary Examiner* — Mark Rinehart
*Assistant Examiner* — Maharishi Khirodhar
(74) *Attorney, Agent, or Firm* — Garlick & Markison; Randy W. Lacasse

(57) ABSTRACT

Polling using B-ACK for occasional back-channel traffic in VoWIFI applications. Within wireless communication systems having a relatively asymmetric channel (e.g., relative more downstream traffic than upstream), certain upstream communications (e.g., acknowledgments (ACKs) and/or block acknowledgments (B-ACKs)) include indication therein (e.g., piggybacked therein) that a given downstream located communication device desires/needs to make upstream communication. In some instances, specificity is also provided therein to indicate the type of information to be transmitted upstream. Such a communication protocol mitigates (or eliminates) contention between upstream and downstream traffic in an environment with significantly more downstream traffic (e.g., such as ongoing downstream traffic that may include streaming video). A coordinating device (e.g., access point (AP)) may employ such upstream provided indicia to coordinate upstream and downstream communications within the wireless communication system in a non-contentious manner that does not deleteriously affect ongoing downstream traffic.

20 Claims, 12 Drawing Sheets

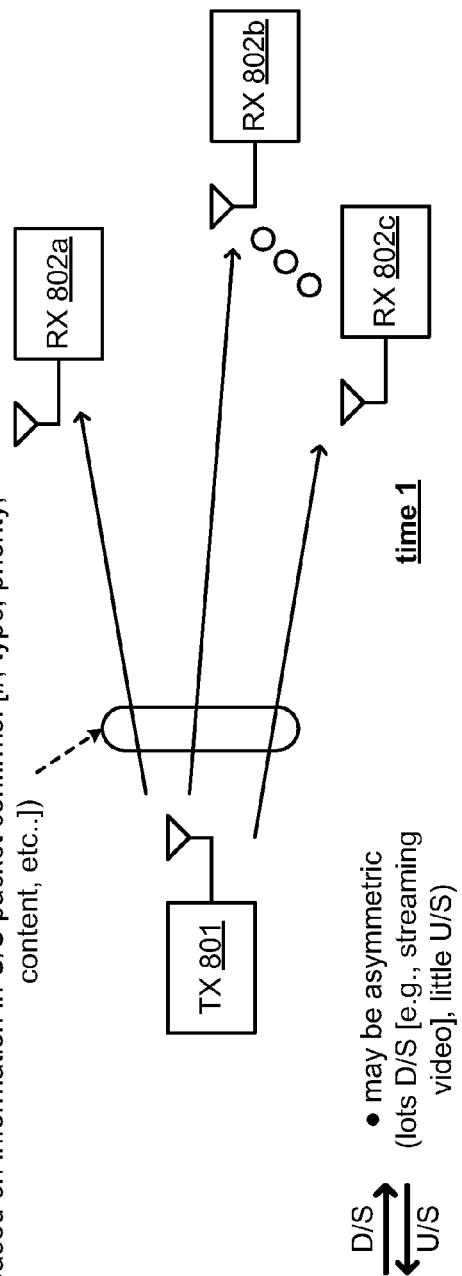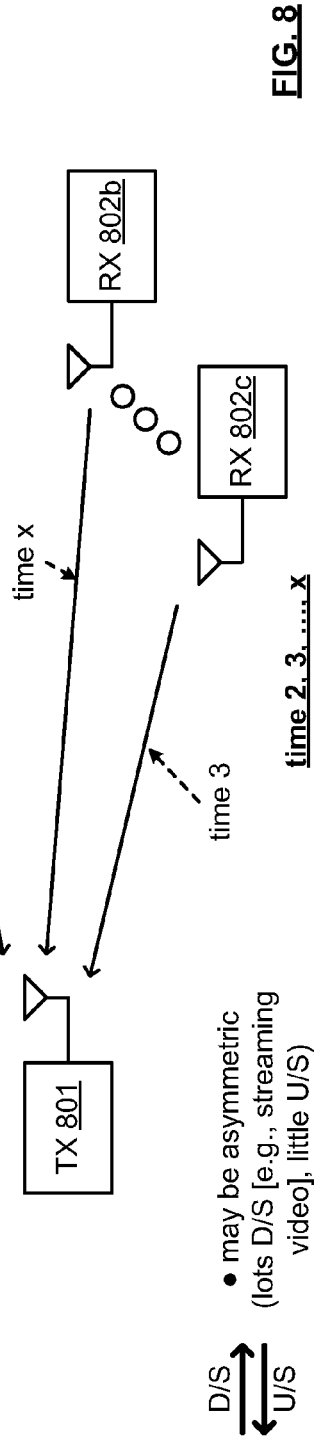
FIG. 8

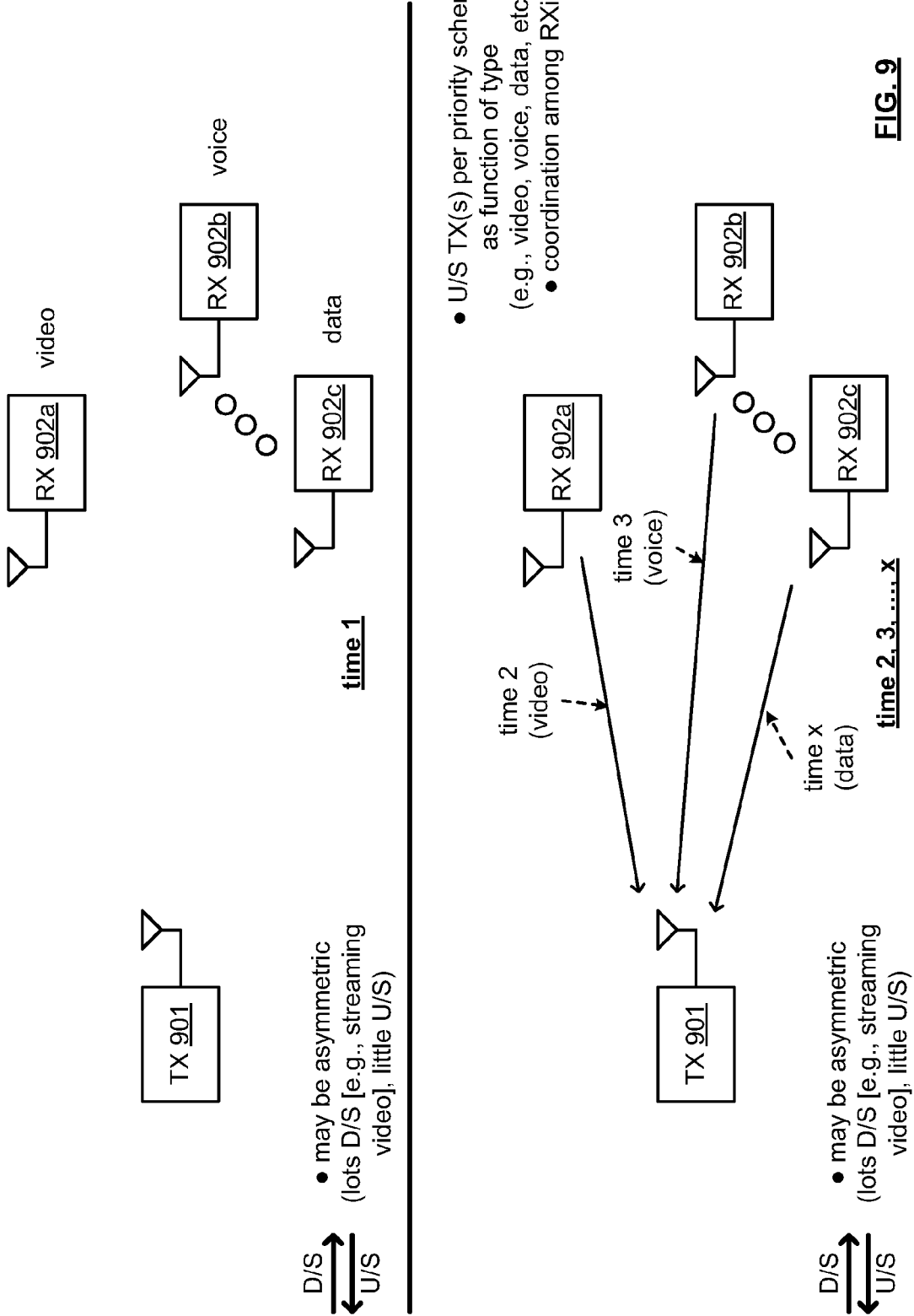

POLLING USING B-ACK FOR OCCASIONAL BACK-CHANNEL TRAFFIC IN VOWIFI APPLICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/491,838, entitled "Media communications and signaling within wireless communication systems," filed May 31, 2011, pending.

INCORPORATION BY REFERENCE

The following standards/draft standards are hereby incorporated herein by reference in their entirety and are made part of the present U.S. Utility Patent Application for all purposes:

1. WD1: Working Draft 1 of High-Efficiency Video Coding, Joint Collaborative Team on Video Coding (JCT-VC), of ITU-T SG16 WP3 and ISO/IEC JTC1/SC29/WG11, Thomas Wiegand, et al., 3rd Meeting: Guangzhou, Conn., 7-15 October, 2010, Document: JCTVC-C403, 137 pages.

2. ISO/IEC 14496—10-MPEG-4 Part 10, AVC (Advanced Video Coding), alternatively referred to as H.264/MPEG-4 Part 10 or AVC (Advanced Video Coding), ITU H.264/MPEG4-AVC, or equivalent.

INCORPORATION BY REFERENCE

The following IEEE standards/draft IEEE standards are hereby incorporated herein by reference in their entirety and are made part of the present U.S. Utility Patent Application for all purposes:

1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™—2007, (Revision of IEEE Std 802.11—1999), 1233 pages.

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 pages.

3. IEEE P802.11ac™/D1.0, May 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 263 total pages (pp. i-xxi, 1-242).

BACKGROUND OF THE INVENTION

1. Technical Field of the Invention

The invention relates generally to wireless communication systems; and, more particularly, it relates to mitigating contention between upstream and downstream communication paths within such wireless communication systems, including those effectuating video communications therein.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier (PA). The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), and particularly within communication devices that may employ multiple communication paths therein, the present art does not provide an adequate solution by which various communications maybe performed and operated in a communication device without deleterious affecting one another.

In the context of wireless communications and particularly the transmission and receipt of signals therein that include media content (e.g., video, audio, etc.), certain considerations should be made that are not necessary within non-media related signaling. For example, certain non-media related signals do not suffer significant degradation of performance from latency, delay, etc. Often times, such media related content communications are relatively more time critical than non-media related content communications. Particularly in the context of wireless communications, the present art does not provide an adequate means by which media related content communications may be effectuated in a robust, reliable, and perceptually acceptable manner.

BRIEF DESCRIPTION OF THE SEVERAL
VIEWS OF THE DRAWINGS

FIG. 8 is a diagram illustrating an embodiment of scheduled upstream (U/S) communications from a number of receiver wireless communication devices to a transmitter wireless communication device in accordance with polling, management, or control as initiated by the transmitter wireless communication device.

FIG. 9 is a diagram illustrating an embodiment of scheduled upstream (U/S) communications from a number of receiver wireless communication devices to a transmitter wireless communication device based on coordination among the receiver wireless communication devices and prioritization of the respective content to be transmitted by the receiver wireless communication devices.

FIG. 10A, FIG. 10B, FIG. 11A, FIG. 11B, FIG. 12A, and FIG. 12B illustrate various embodiment of methods as may be performed in accordance with operation of various devices such as various wireless communication devices.

DETAILED DESCRIPTION OF THE INVENTION

Figure 1:
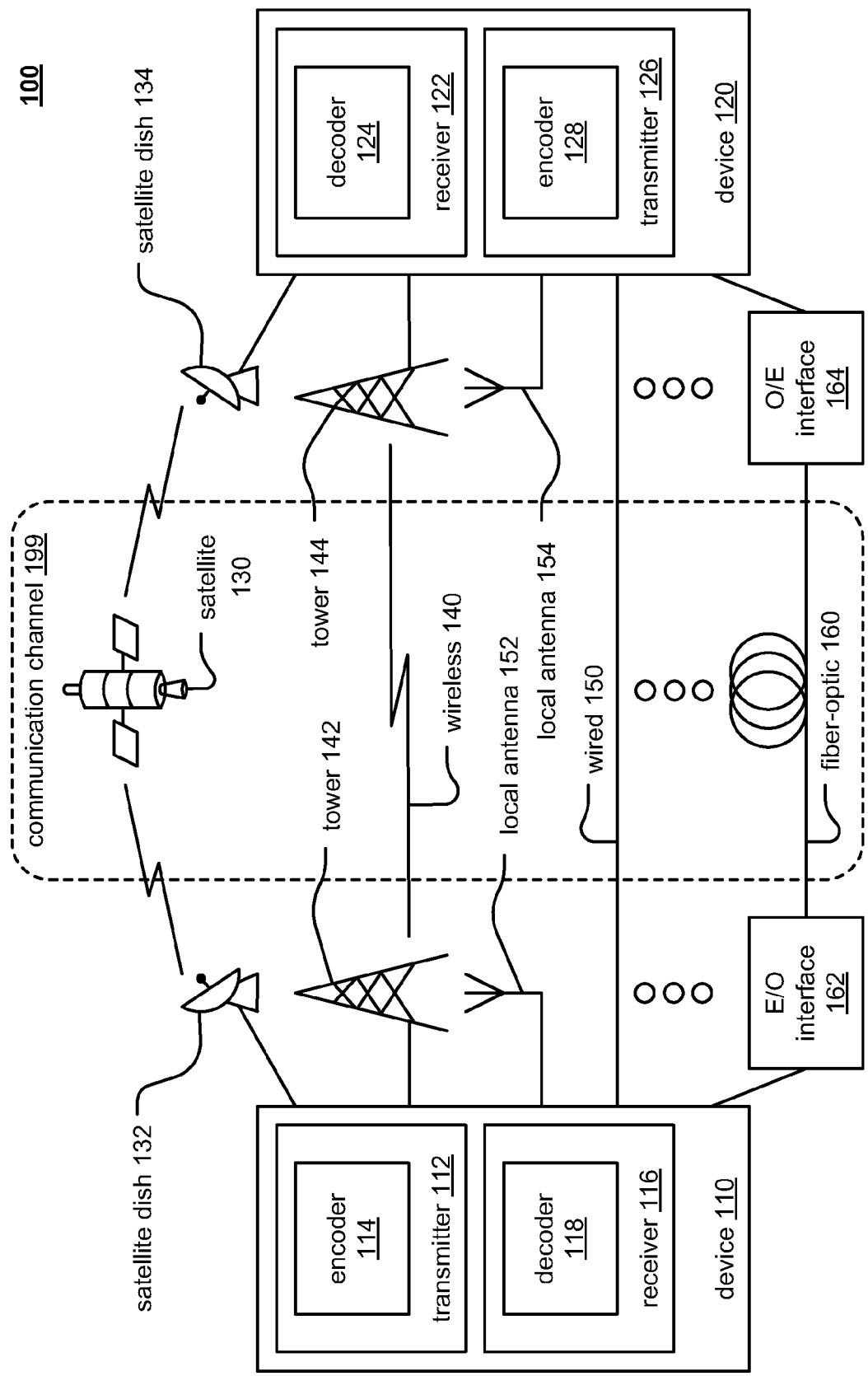
FIG. 1 and FIG. 2 are diagrams illustrating various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
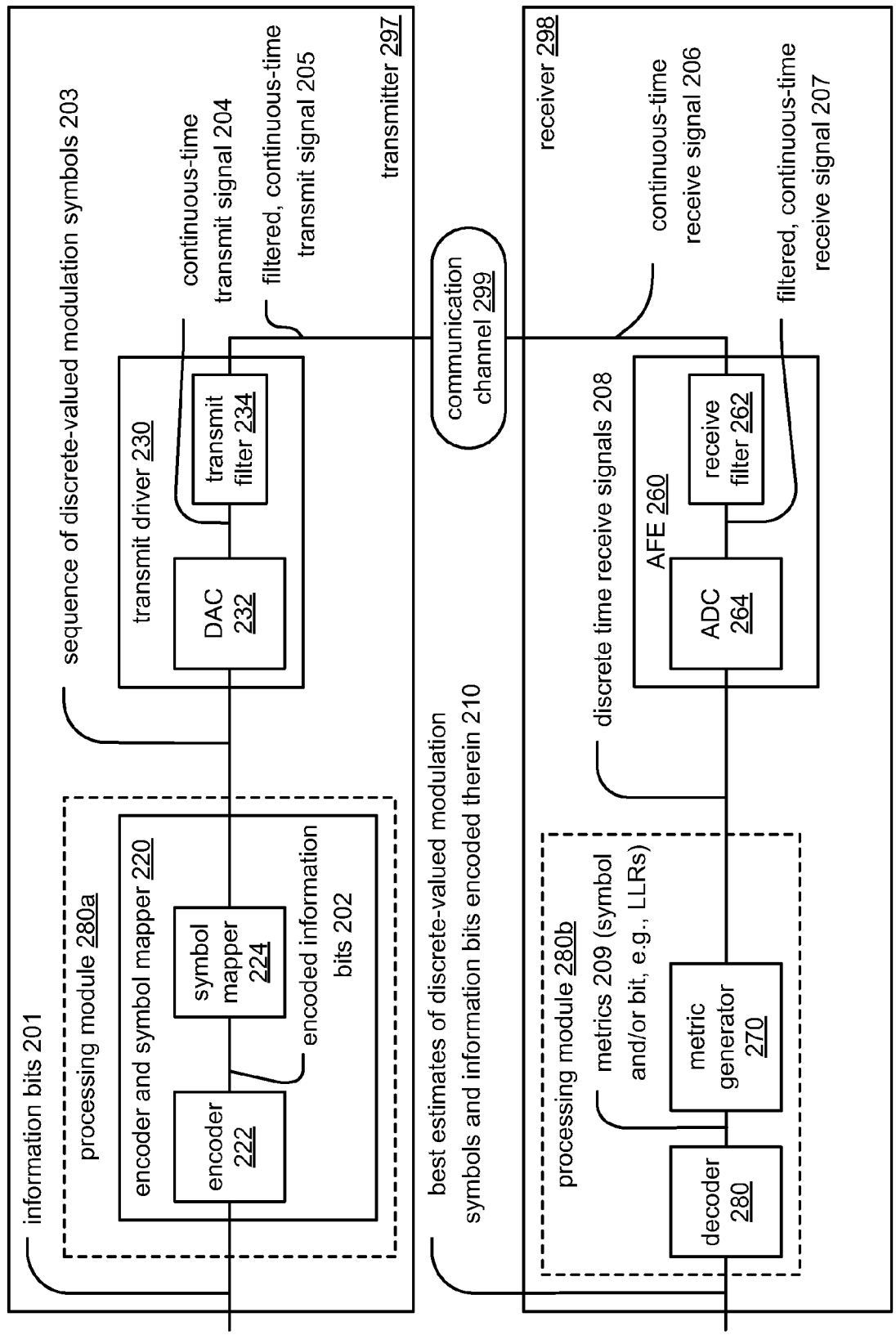

FIG. 1 and FIG. 2 are diagrams illustrating various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
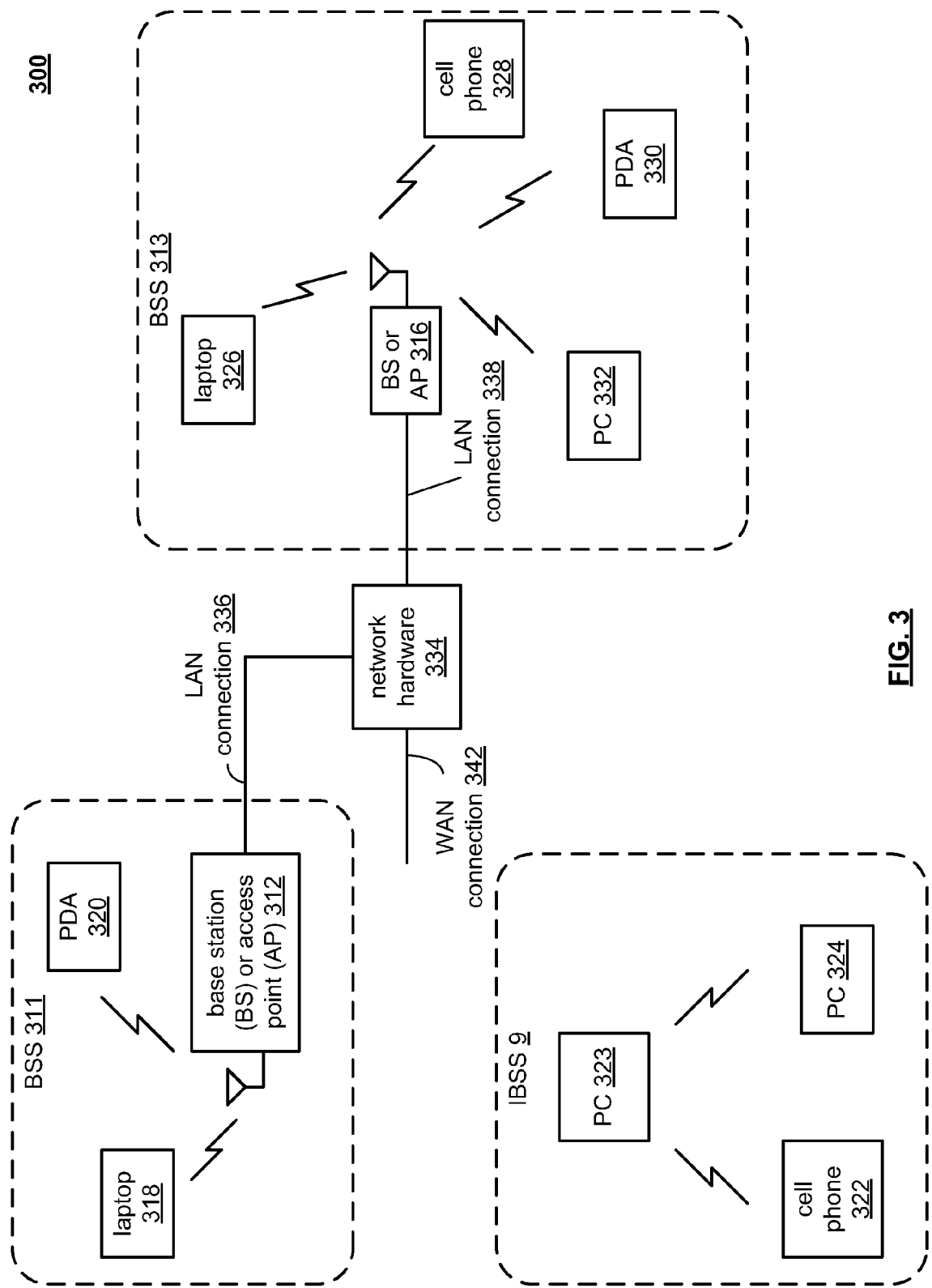
FIG. 3 is a diagram illustrating an alternative embodiment of a wireless communication system.

FIG. 3 is a diagram illustrating an embodiment of a wireless communication system 300. The wireless communication system 300 includes a plurality of base stations and/or access points 312, 316, a plurality of wireless communication devices 318-332 and a network hardware component 334. Note that the network hardware 334, which may be a router, switch, bridge, modem, system controller, etc., provides a wide area network connection 342 for the communication system 300. Further note that the wireless communication devices 318-332 may be laptop host computers 318 and 326, personal digital assistant hosts 320 and 330, personal computer hosts 324 and 332 and/or cellular telephone hosts 322 and 328.

Wireless communication devices 322, 323, and 324 are located within an independent basic service set (IBSS) area and communicate directly (i.e., point to point). In this configuration, these devices 322, 323, and 324 may only communicate with each other. To communicate with other wireless communication devices within the system 300 or to communicate outside of the system 300, the devices 322, 323, and/or 324 need to affiliate with one of the base stations or access points 312 or 316.

The base stations or access points 312, 316 are located within basic service set (BSS) areas 311 and 313, respectively, and are operably coupled to the network hardware 334 via local area network connections 336, 338. Such a connection provides the base station or access point 312-316 with connectivity to other devices within the system 300 and provides connectivity to other networks via the WAN connection 342. To communicate with the wireless communication devices within its BSS 311 or 313, each of the base stations or access points 312-116 has an associated antenna or antenna array. For instance, base station or access point 312 wirelessly communicates with wireless communication devices 318 and 320 while base station or access point 316 wirelessly communicates with wireless communication devices 326-332. Typically, the wireless communication devices register with a particular base station or access point 312, 316 to receive services from the communication system 300.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 4:
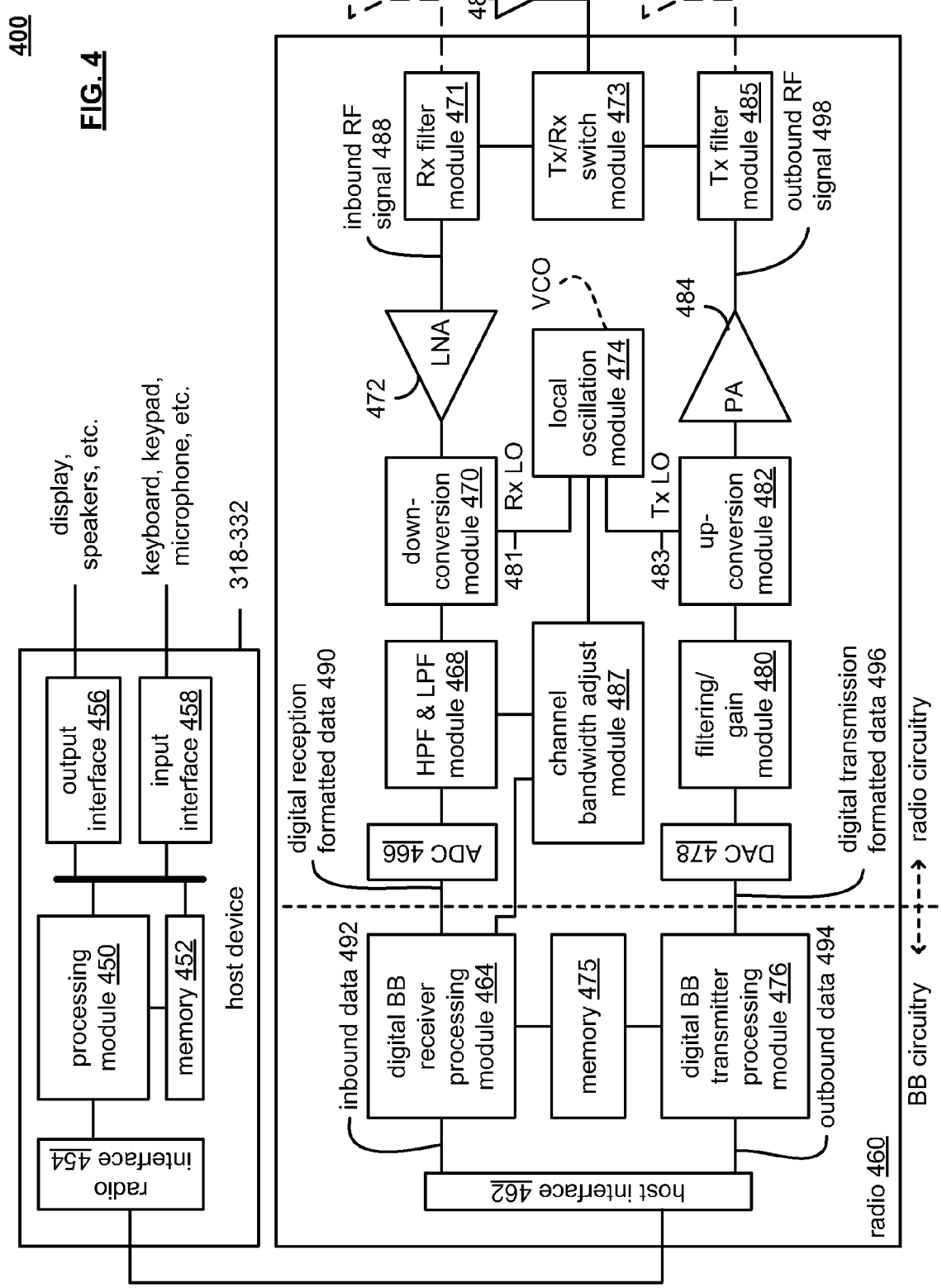
FIG. 4 is a diagram illustrating an embodiment of a wireless communication device.

FIG. 4 is a diagram illustrating an embodiment 300 of a wireless communication device that includes the host device 318-332 and an associated radio 460. For cellular telephone hosts, the radio 460 is a built-in component. For personal digital assistants hosts, laptop hosts, and/or personal computer hosts, the radio 460 may be built-in or an externally coupled component.

As illustrated, the host device 318-332 includes a processing module 450, memory 452, a radio interface 454, an input interface 458, and an output interface 456. The processing module 450 and memory 452 execute the corresponding instructions that are typically done by the host device. For example, for a cellular telephone host device, the processing module 450 performs the corresponding communication functions in accordance with a particular cellular telephone standard.

The radio interface 454 allows data to be received from and sent to the radio 460. For data received from the radio 460 (e.g., inbound data), the radio interface 454 provides the data to the processing module 450 for further processing and/or routing to the output interface 456. The output interface 456 provides connectivity to an output display device such as a display, monitor, speakers, etc., such that the received data may be displayed. The radio interface 454 also provides data from the processing module 450 to the radio 460. The processing module 450 may receive the outbound data from an input device such as a keyboard, keypad, microphone, etc., via the input interface 458 or generate the data itself. For data received via the input interface 458, the processing module 450 may perform a corresponding host function on the data and/or route it to the radio 460 via the radio interface 454.

Radio 460 includes a host interface 462, digital receiver processing module 464, an analog-to-digital converter 466, a high pass and low pass filter module 468, an IF mixing down conversion stage 470, a receiver filter 471, a low noise amplifier 472, a transmitter/receiver switch 473, a local oscillation module 474 (which may be implemented, at least in part, using a voltage controlled oscillator (VCO)), memory 475, a digital transmitter processing module 476, a digital-to-analog converter 478, a filtering/gain module 480, an IF mixing up conversion stage 482, a power amplifier 484, a transmitter filter module 485, a channel bandwidth adjust module 487, and an antenna 486. The antenna 486 may be a single antenna that is shared by the transmit and receive paths as regulated by the Tx/Rx switch 473, or may include separate antennas for the transmit path and receive path. The antenna implementation will depend on the particular standard to which the wireless communication device is compliant.

The digital receiver processing module 464 and the digital transmitter processing module 476, in combination with operational instructions stored in memory 475, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 464 and 476 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 475 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 464 and/or 476 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 460 receives outbound data 494 from the host device via the host interface 462. The host interface 462 routes the outbound data 494 to the digital transmitter processing module 476, which processes the outbound data 494 in accordance with a particular wireless communication standard (e.g., IEEE 802.11, Bluetooth, ZigBee, WiMAX (Worldwide Interoperability for Microwave Access), any other type of radio frequency based network protocol and/or variations thereof etc.) to produce outbound baseband signals 496. The outbound baseband signals 496 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 478 converts the outbound baseband signals 496 from the digital domain to the analog domain. The filtering/gain module 480 filters and/or adjusts the gain of the analog signals prior to providing it to the IF mixing stage 482. The IF mixing stage 482 converts the analog baseband or low IF signals into RF signals based on a transmitter local oscillation 483 provided by local oscillation module 474. The power amplifier 484 amplifies the RF signals to produce outbound RF signals 498, which are filtered by the transmitter filter module 485. The antenna 486 transmits the outbound RF signals 498 to a targeted device such as a base station, an access point and/or another wireless communication device.

The radio 460 also receives inbound RF signals 488 via the antenna 486, which were transmitted by a base station, an access point, or another wireless communication device. The antenna 486 provides the inbound RF signals 488 to the receiver filter module 471 via the Tx/Rx switch 473, where the Rx filter 471 bandpass filters the inbound RF signals 488. The Rx filter 471 provides the filtered RF signals to low noise amplifier 472, which amplifies the signals 488 to produce an amplified inbound RF signals. The low noise amplifier 472 provides the amplified inbound RF signals to the IF mixing module 470, which directly converts the amplified inbound RF signals into an inbound low IF signals or baseband signals based on a receiver local oscillation 481 provided by local oscillation module 474. The down conversion module 470 provides the inbound low IF signals or baseband signals to the filtering/gain module 468. The high pass and low pass filter module 468 filters, based on settings provided by the channel bandwidth adjust module 487, the inbound low IF signals or the inbound baseband signals to produce filtered inbound signals.

The analog-to-digital converter 466 converts the filtered inbound signals from the analog domain to the digital domain to produce inbound baseband signals 490, where the inbound baseband signals 490 will be digital base-band signals or digital low IF signals, where the low IF typically will be in the frequency range of one hundred kHz to a few MHz. The digital receiver processing module 464, based on settings provided by the channel bandwidth adjust module 487, decodes, descrambles, demaps, and/or demodulates the inbound baseband signals 490 to recapture inbound data 492 in accordance with the particular wireless communication standard being implemented by radio 460. The host interface 462 provides the recaptured inbound data 492 to the host device 318-332 via the radio interface 454.

As one of average skill in the art will appreciate, the wireless communication device of the embodiment 400 of FIG. 4 may be implemented using one or more integrated circuits. For example, the host device may be implemented on one integrated circuit, the digital receiver processing module 464, the digital transmitter processing module 476 and memory 475 may be implemented on a second integrated circuit, and the remaining components of the radio 460, less the antenna 486, may be implemented on a third integrated circuit. As an alternate example, the radio 460 may be implemented on a single integrated circuit. As yet another example, the processing module 450 of the host device and the digital receiver and transmitter processing modules 464 and 476 may be a common processing device implemented on a single integrated circuit. Further, the memory 452 and memory 475 may be implemented on a single integrated circuit and/or on the same integrated circuit as the common processing modules of processing module 450 and the digital receiver and transmitter processing module 464 and 476.

Any of the various embodiments of communication device that may be implemented within various communication systems can incorporate functionality to perform communication via more than one standard, protocol, or other predetermined means of communication. For example, a single communication device, designed in accordance with certain aspects of the invention, can include functionality to perform communication in accordance with a first protocol, a second protocol, and/or a third protocol, and so on. These various protocols may be WiMAX (Worldwide Interoperability for Microwave Access) protocol, a protocol that complies with a wireless local area network (WLAN/WiFi) (e.g., one of the IEEE (Institute of Electrical and Electronics Engineer) 802.11 protocols such as 802.11a, 802.11b, 802.11g, 802.11n, 802.11ac, etc.), a Bluetooth protocol, or any other predetermined means by which wireless communication may be effectuated.

Figure 5:
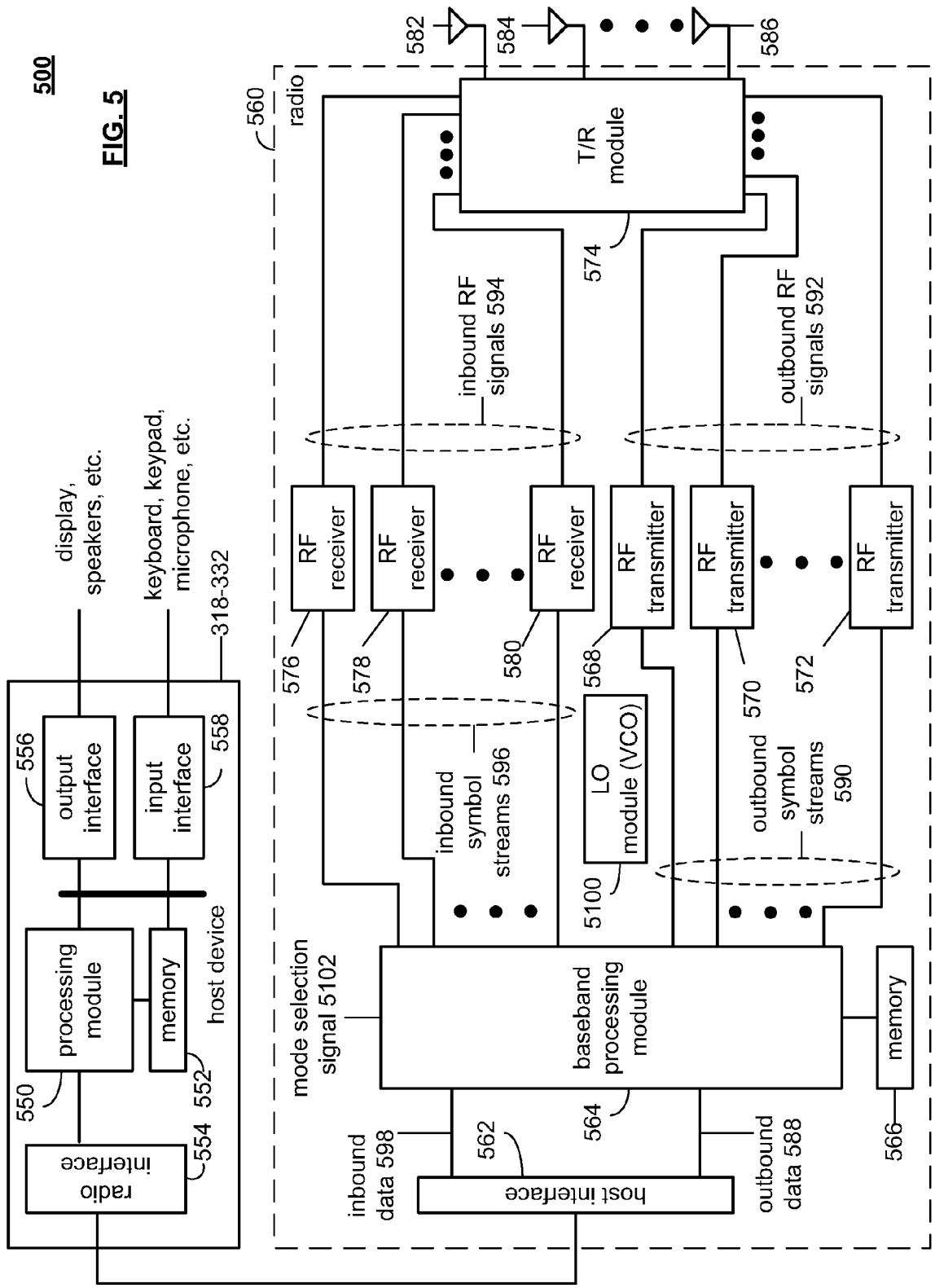
FIG. 5 is a diagram illustrating an alternative embodiment of a wireless communication device.

FIG. 5 is a diagram illustrating an alternative embodiment of a wireless communication device that includes the host device 318-332 and an associated at least one radio 560. For cellular telephone hosts, the radio 560 is a built-in component. For personal digital assistants hosts, laptop hosts, and/or personal computer hosts, the radio 560 may be built-in or an externally coupled component. For access points or base stations, the components are typically housed in a single structure.

As illustrated, the host device 318-332 includes a processing module 550, memory 552, radio interface 554, input interface 558 and output interface 556. The processing module 550 and memory 552 execute the corresponding instructions that are typically done by the host device. For example, for a cellular telephone host device, the processing module 550 performs the corresponding communication functions in accordance with a particular cellular telephone standard.

The radio interface 554 allows data to be received from and sent to the radio 560. For data received from the radio 560 (e.g., inbound data), the radio interface 554 provides the data to the processing module 550 for further processing and/or routing to the output interface 556. The output interface 556 provides connectivity to an output display device such as a display, monitor, speakers, et cetera such that the received data may be displayed. The radio interface 554 also provides data from the processing module 550 to the radio 560. The processing module 550 may receive the outbound data from an input device such as a keyboard, keypad, microphone, et cetera via the input interface 558 or generate the data itself. For data received via the input interface 558, the processing module 550 may perform a corresponding host function on the data and/or route it to the radio 560 via the radio interface 554.

Radio 560 includes a host interface 562, a baseband processing module 564, memory 566, a plurality of radio frequency (RF) transmitters 568-372, a transmit/receive (T/R) module 574, a plurality of antennae 582-386, a plurality of RF receivers 576-380, and a local oscillation module 5100 (which may be implemented, at least in part, using a VCO). The baseband processing module 564, in combination with operational instructions stored in memory 566, execute digital receiver functions and digital transmitter functions, respectively. The digital receiver functions, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, include, but are not limited to, scrambling, encoding, interleaving, constellation mapping, modulation, inverse fast Fourier transform, cyclic prefix addition, space and time encoding, and/or digital baseband to IF conversion. The baseband processing modules 564 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 566 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 564 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 560 receives outbound data 588 from the host device via the host interface 562. The baseband processing module 564 receives the outbound data 588 and, based on a mode selection signal 5102, produces one or more outbound symbol streams 590. The mode selection signal 5102 will indicate a particular mode as are illustrated in the mode selection tables, which appear at the end of the detailed discussion. Such operation as described herein is exemplary with respect to at least one possible embodiment, and it is of course noted that the various aspects and principles, and their equivalents, of the invention may be extended to other embodiments without departing from the scope and spirit of the invention.

For example, the mode selection signal 5102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), and data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 5102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 564, based on the mode selection signal 5102 produces the one or more outbound symbol streams 590 from the output data 588. For example, if the mode selection signal 5102 indicates that a single transmit antenna is being utilized for the particular mode that has been selected, the baseband processing module 564 will produce a single outbound symbol stream 590. Alternatively, if the mode select signal indicates 2, 3 or 4 antennae, the baseband processing module 564 will produce 2, 3 or 4 outbound symbol streams 590 corresponding to the number of antennae from the output data 588.

Depending on the number of outbound streams 590 produced by the baseband module 564, a corresponding number of the RF transmitters 568-372 will be enabled to convert the outbound symbol streams 590 into outbound RF signals 592. The transmit/receive module 574 receives the outbound RF signals 592 and provides each outbound RF signal to a corresponding antenna 582-386.

When the radio 560 is in the receive mode, the transmit/receive module 574 receives one or more inbound RF signals via the antennae 582-386. The T/R module 574 provides the inbound RF signals 594 to one or more RF receivers 576-380. The RF receiver 576-380 converts the inbound RF signals 594 into a corresponding number of inbound symbol streams 596. The number of inbound symbol streams 596 will correspond to the particular mode in which the data was received (recall that the mode may be any one of the modes illustrated in tables 1-12). The baseband processing module 560 receives the inbound symbol streams 590 and converts them into inbound data 598, which is provided to the host device 318-332 via the host interface 562.

In one embodiment of radio 560 it includes a transmitter and a receiver. The transmitter may include a MAC module, a PLCP module, and a PMD module. The Medium Access Control (MAC) module, which may be implemented with the processing module 564, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 564, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 564, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

It is also noted that the wireless communication device of this diagram, as well as others described herein, may be implemented using one or more integrated circuits. For example, the host device may be implemented on one integrated circuit, the baseband processing module 564 and memory 566 may be implemented on a second integrated circuit, and the remaining components of the radio 560, less the antennae 582-586, may be implemented on a third integrated circuit. As an alternate example, the radio 560 may be implemented on a single integrated circuit. As yet another example, the processing module 550 of the host device and the baseband processing module 564 may be a common processing device implemented on a single integrated circuit. Further, the memory 552 and memory 566 may be implemented on a single integrated circuit and/or on the same integrated circuit as the common processing modules of processing module 550 and the baseband processing module 564.

The previous diagrams and their associated written description illustrate some possible embodiments by which a wireless communication device may be constructed and implemented. In some embodiments, more than one radio (e.g., such as multiple instantiations of the radio 460, the radio 560, a combination thereof, or even another implementation of a radio) is implemented within a wireless communication device. For example, a single wireless communication device can include multiple radios therein to effectuate simultaneous transmission of two or more signals. Also, multiple radios within a wireless communication device can effectuate simultaneous reception of two or more signals, or transmission of one or more signals at the same time as reception of one or more other signals (e.g., simultaneous transmission/reception).

Within the various diagrams and embodiments described and depicted herein, wireless communication devices may generally be referred to as WDEVs, DEVs, TXs, and/or RXs. It is noted that such wireless communication devices may be wireless stations (STAs), access points (APs), or any other type of wireless communication device without departing from the scope and spirit of the invention. Generally speaking, wireless communication devices that are APs may be referred to as transmitting or transmitter wireless communication devices, and wireless communication devices that are STAs may be referred to as receiving or receiver wireless communication devices in certain contexts.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications.

Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ah, ad, af, etc.).

A novel system and approach is presented herein by which occasional back channel traffic communications are provided upstream within a wireless video communication system in which the majority of communications are made downstream. That is to say, a majority of communications are effectuated in a downstream manner (e.g., from a transmitter wireless communication device [TX] to one or more receiver wireless communication devices [RXs]). Generally speaking, the communications within the wireless video communication system may be viewed as being asymmetric, in that, there is relatively much more downstream communications than upstream communications. Also, while the general nomenclature of transmitter wireless communication device [TX] and receiver wireless communication devices [RXs] is employed herein to describe this asymmetric nature of directional communications within such a wireless video communication system, it is of course noted that the respective transmitter wireless communication device [TX] and receiver wireless communication devices [RXs] may nonetheless support and perform bidirectional communications.

That is to say, within this embodiment as with respect to others, it is noted that while certain of the wireless communication devices are depicted generally as being transmitters (e.g., TXs) and other of the wireless communication devices are depicted generally as being receivers (e.g., RXs), any of the respective wireless communication devices within such embodiments may be operative to support bidirectional communications. That is to say, while a majority of communications within such an embodiment may flow from the transmitter wireless communication device 601 to the various receiver wireless communication devices 602a-602c (e.g., in accordance with what may be described as downstream communications, such as with respect to FIG. 6 described in greater detail below), it is noted that communications may nonetheless be directed from the receiver wireless communication devices 602a-602c to the transmitter wireless communication device 601 (e.g., in accordance with what may be described as upstream communications, such as in accordance with feedback, acknowledgments, channel estimation information, channel characterization information, and/or any other types of communications).

Generally speaking, communications from the transmitter wireless communication device 601 (TX 601) to the receiver wireless communication devices 602a-602c (RXs 602a-602c) may be described as being downstream communications, while communications from the receiver wireless communication devices 602a-602c to the transmitter wireless communication device 601 may be described as being upstream communications. The reader will appropriately understand that while a majority of communications are effectuated in the downstream direction (e.g., from TX to one or more RXs), there may of course be some communications effectuated in the upstream direction (e.g., from one or more RXs to the TX).

From certain perspectives, a novel system in approach is presented herein that addresses upstream and downstream contention within wireless communication systems having a channel traffic that may be described as asymmetric. That is to say, in the context of a wireless communication system in which a majority of the communications are downstream (e.g., including ongoing downstream traffic such as in accordance with a downstream streaming video embodiment), there may undesirably be contention between upstream and downstream communications. Herein, such upstream and downstream contention is handled appropriately so that the majority downstream communications may be made without problem. Generally speaking, one of the devices within the system (e.g., a TX) performs polling of the clients or recipients of the downstream communications (e.g., RXs) in order to determine whether those clients or recipients have a need or desire to perform any upstream communications.

Referring particularly to the diagram, downstream communications are made from TX 601 to the RXs 602a-602c. Generally speaking, such communications between the respective devices within the diagram may be viewed as being largely asymmetric, and that the majority of the communications are made downstream, while relatively fewer are made upstream. The downstream communications may be of any desired type. For example, in certain embodiments those downstream communications are packets, such as one or more aggregated MAC (media access control) data protocol units (A-MPDUs) or a MAC (media access control) data protocol units (MPDUs) provided from a transmitter wireless communication device (e.g., TX 601) to one or more receiver wireless communication devices (e.g., RXs 602a-602c). For example, within certain bandwidth limited channels for example, better performance may sometimes be achieved by aggregating multiple MPDUs together thereby forming an A-MPDU. In the context of highly bandwidth consumptive content (e.g., video signaling) as being transmitted from a given device to a number of other devices, better performance may be achieved by aggregating multiple MPDUs together thereby forming an A-MPDU. Of course, multiple A-MPDUs may be transmitted from a given device to a number of other devices.

In response to those downstream communications, the RXs 602a-602c may each respectively provide packet confirmations upstream to the TX 601. Any of a variety of types of exchanges between the TX 601 and the RXs 602a-602c may be made in accordance with the operations and functionality is presented herein. For example, the downstream communications from the TX 601 to the RXs 602a-602c may be made using MPDUs and/or A-MPDUs, and the upstream packet confirmations may be implemented as one or more acknowledgments (ACKs) and/or block acknowledgments (B-ACKs).

For example, certain communication protocols (e.g., transmission control protocol/Internet protocol (TCP/IP)) operate by providing upstream confirmations and/or acknowledgments continually based upon received transmissions. Within any such communication protocol that employs such an upstream confirmation scheme, certain information may be piggybacked onto such upstream confirmations (e.g., upstream confirmation packets, acknowledgments, and/or block acknowledgment). Within such an upstream communication from a receiver wireless communication device (e.g., such upstream confirmations that are provided from the RXs 602a-602c to the TX 601), an indication may be provided therein (e.g., piggybacked therein) indicating that particular receiver wireless communication device has information that it would like to transmit upstream to the transmitter wireless communication device.

In some embodiments, such an upstream communication (e.g., packet confirmation) from a receiver wireless communication device also provides indicia specifying which type of information it has to transmit. Also, additional information may be included therein to indicate other characteristics of the upstream communication(s) (e.g., the total size or amount of the information to be communicated upstream, associated priority of such information, type of content, etc.).

It is noted that any of a variety of different types of downstream communications and upstream confirmations may be made. For example, the downstream communications may include different types of packets, and the upstream confirmations may be packet confirmations. One particular type of such exchanges may include MPDUs and/or A-MPDUs provided downstream from the TX 601, and upstream confirmations are provided from the respective RXs 602a-602c in the form of ACKs and/or B-ACKs. Another type of such exchanges may include request to send (RTS)/clear to send (CTS) exchanges in which RTSs are provided downstream from the TX601, and upstream confirmations are provided from the respective RXs 602a-602c in the form of CTSs. In speaking, any communication exchange in which there are confirmations provided upstream based on receipt of such communications downstream may employ the various functionality and operations as described herein.

Figure 6:
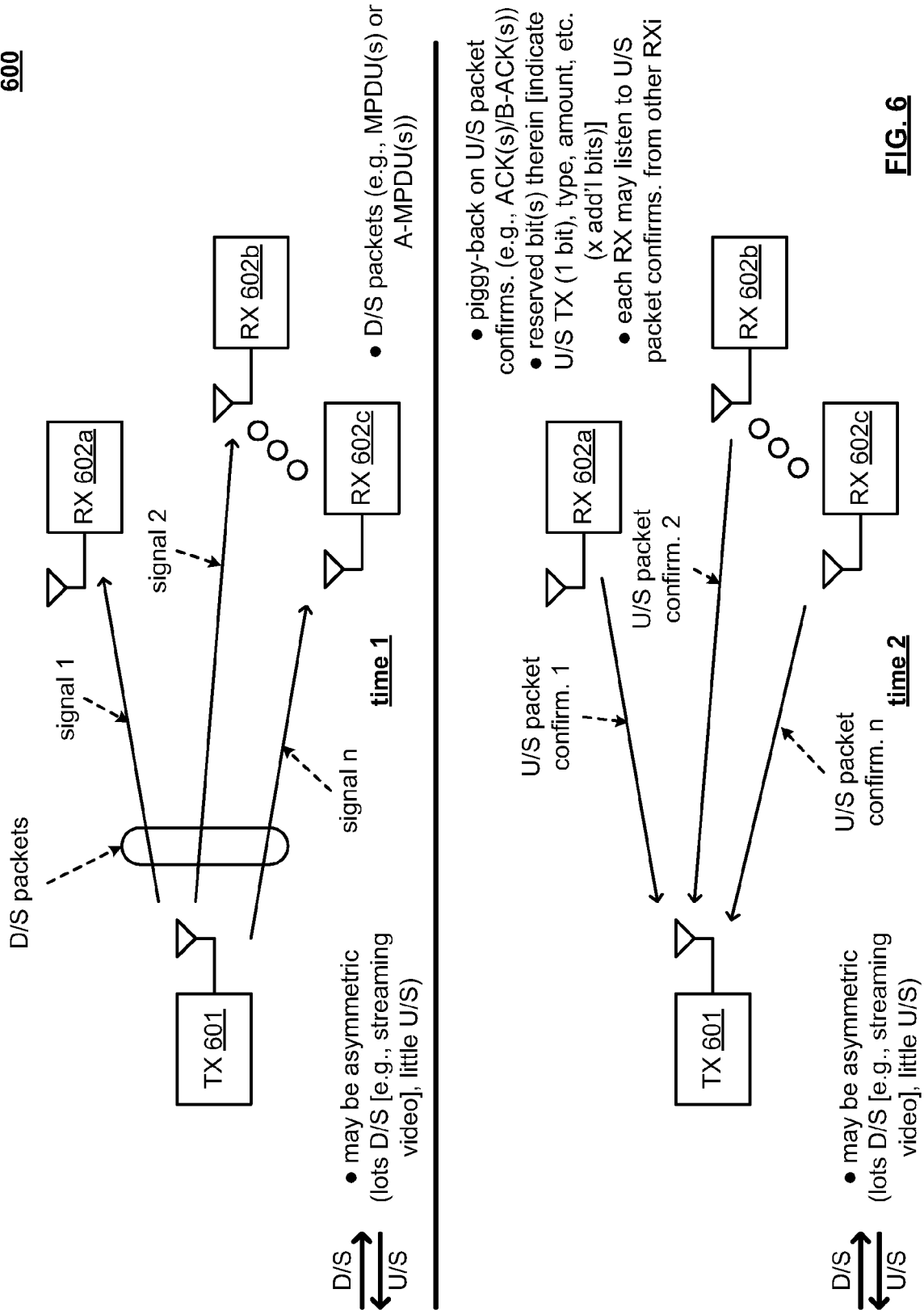
FIG. 6 is a diagram illustrating an embodiment for effectuating upstream (U/S) and downstream (D/S) contention within wireless communication systems operative to support delivery of media and/or video content.

FIG. 6 is a diagram illustrating an embodiment 600 for effectuating upstream (U/S) and downstream (D/S) contention within wireless communication systems operative to support delivery of media and/or video content. As may be seen with respect to this embodiment, device 601 is operative to transmit one or more downstream communications (e.g., packets, which may be A-MPDUs and/or MPDUs) to a number of devices 602a-602c. In some embodiments, the very same information is transmitted to each of the devices 602a-602c. In other embodiments, different respective information is transmitted to each of the devices 602a-602c. That is to say, first information may be transmitted to the device 602a, second information be transmitted to the device 602b, and so on.

In the context of wireless video delivery from device 601 to the devices 602a-602c, with respect to one embodiment, different respective video signals may be respectively transmitted to each of the devices 602a-602c. In another embodiment, the same video signal is transmitted to each of the devices 602a-602c. If adequate and sufficient bandwidth is available, a common video signal may be transmitted to each of the devices 602a-602c, and each of the devices 602a-602c may include appropriate tuning functionality to select a particular sub-component or sub-signal within that common video signal.

Generally speaking, the communication between the device 601 and the devices 602a-602c will be effectuated in accordance with an asymmetric communication channel in which a majority of the communications is performed downstream with relatively little upstream communications. For example, in the context of wireless video delivery from device 601 to the devices 602a-602c, streaming video may be transmitted downstream from the device 601 to the devices 602a-602c. In comparison, relatively little upstream communication is made from the one or more of the devices 602a-602c to the device 601.

As may be seen with respect to this diagram, upstream confirmations may be provided respectively from the various devices 602a-602c to the device 601. In certain embodiments, these upstream confirmations are packet confirmations implemented as ACK and/or B-ACKs that are transmitted from the devices 602a-602c to the device 601. Generally speaking, an upstream confirmation packet may include one or more reserved bits therein. For example, in the embodiment of an upstream confirmation packet (e.g., acknowledgment or block acknowledgment), such upstream confirmations may be implemented such that they include one or more reserved bits therein. Such reserved bits may be operative to indicate that a given device (e.g., given RX, client) intends or wishes to transmit information to the device 601 (e.g., the TX).

For example, within one embodiment, a block acknowledgment can include anywhere between 4 to 6 reserved bits. In one embodiment, one of the reserved bits is employed to indicate that a given device (e.g., given RX, client) intends or wishes to transmit information to the device 601 (e.g., the TX). When the device 601 receives such an upstream confirmation packet (e.g., acknowledgment or block acknowledgment) from a given one of the devices 602a-602c that indicates that the given device wishes to make an upstream indication, the device 601 is operative to effectuate some means by which that upstream communication may be made in a non-contentious manner with respect to the downstream communications.

If desired within a given embodiment, one or more other of the reserved bits within such an upstream confirmation packet (e.g., acknowledgment or block acknowledgment) may also be used to indicate the type of information that a given device (e.g., given RX, client) intends or wishes to transmit information to the device 601 (e.g., the TX). For example, some types of data may be video, data, voice, etc. Different types of data may be afforded or have a different priority associated therewith. In addition, one or more other of the reserved bits within such an upstream confirmation packet (e.g., acknowledgment or block acknowledgment) may be used to indicate certain measurements and/or information associated with one or more operational parameters (e.g., signal-to-noise ratio (SNR), packet error rate (PER), channel characterization, channel estimation, etc.) that a given device (e.g., given RX, client) intends or wishes to transmit information to the device 601 (e.g., the TX).

As mentioned above, in response to receiving indicia within an upstream packet confirmation from one of the devices 602a-602c, the device 601 is operative to facilitate such an upstream communication. There are a variety of manners by which the device 601 may effectuate such upstream communications in a non-contentious manner with respect to any ongoing downstream traffic.

For example, in one embodiment, the device 601 ceases transmission for a period of time and allows the respective devices 602a-602c to compete for access to the communication medium (e.g., the air). In one embodiment, the device 601 would perform an appropriately tailored back off to ensure that it stays off of the communication medium for a sufficiently long duration during which one or more of the respective devices 602a-602c may make their upstream communications. One means by which non-contentious communications may be made is in accordance with carrier sense multiple access/collision avoidance (CSMA/CA).

If desired, the device 601 may also indicate to one or more of the respective devices 602a-602c a particular number of packets that it may transmit upstream to the device 601. For example, a polling frame transmitted from the 601 can specify a particular access category or information type that it may receive from the devices 602a-602c. As the reader will understand, the use of polling in accordance with communications of the wireless communication systems such as a wireless local area network (WLAN, WiFi network) can allow for relatively tight channel control.

In another embodiment, the device 601 is operative to transmit one or more whole frames respectively to the devices 602a-602c instructing some schedule (e.g., using timeslots such as in accordance with a time division multiple access (TDMA) manner) by which any one or more the respective devices 602a-602c may effectuate such an upstream communication to the device 601. That is to say, different respective periods of time (e.g., $\Delta t_i$, where each i corresponds to a given one of the devices 602a-602c) may be allocated for different devices 602a-602c to make respective upstream communications to the 601. Such a schedule or time allocation may be provided within a prior transmission from the device 601.

Generally speaking, the manner in which such upstream communications are made from the devices 602a-602c is directed by the device 601. For example, even in accordance with an embodiment employing CSMA/CA, it is the device 601 that is operative to instruct the devices 602a-602c to compete for access to the communication medium.

As may be seen with respect to this embodiment, an indication within an upstream confirmation packet (e.g., acknowledgment or a block acknowledgment) may be made using one or more of the reserved bits therein. In one embodiment, a single reserved bit within an upstream confirmation packet (e.g., acknowledgment or a block acknowledgment) is used to indicate that a given one of the devices 602a-602c intends or wishes to make an upstream communication to the device 601. One or more additional reserved bits within an upstream confirmation packet (e.g., acknowledgment or a block acknowledgment) may be employed to indicate a particular type, amount, priority, content, and/or any other desired characteristic associated with such an upstream communication, etc.

As such, in one embodiment, indication is included within an upstream confirmation packet (e.g., acknowledgment or block acknowledgment) that a given one of the devices 602a-602c intends or wishes to make an upstream communication to the device 601. For example, the device 601 then is provided with information regarding which (if any) of those devices 602a-602c intends or wishes to make an upstream communication to the device 601.

In another embodiment, not only does an upstream confirmation packet (e.g., acknowledgment or block acknowledgment) include an indication acknowledgment that a given one of the devices 602a-602c intends or wishes to make an upstream communication to the device 601, but a next level of specificity is provided indicating one or more characteristics of the information that the given one of the devices 602a-602c intends or wishes to make an upstream communication to the device 601. In accordance with such information, the device 601 then is provided with information regarding which (if any) of those devices 602a-602c intends or wishes to make an upstream communication to the device 601 and is also provided additional information regarding one or more characteristics of the information that the devices 602a-602c intend or wish to make an upstream communication to the device 601. As such, the device 601 is operative to perform decision-making in a more intelligent manner (e.g., taking into consideration prioritization among respective upstream communications) regarding a manner and/or order by which those respective upstream communications should take place. For example, depending upon the relative priority of the respective upstream communications to be made from the respective devices 602a-602c, the device 601 may schedule those respective upstream communications to be made within a particular order (e.g., in accordance with the relative priorities among the respective upstream communications; such as the highest priority upstream communication being made first, the second highest priority upstream communication being made second, etc.).

In even other embodiments, one or more of the various devices 602a-602c is operative to listen to acknowledgments or block acknowledgments from the other of the various devices 602a-602c. Each respective one of the various devices 602a-602c may perform some operations based upon the detection of an upstream confirmation packet (e.g., acknowledgment or block acknowledgment) from another of the devices that indicates an impending upstream communication. For example, when a first device detects an upstream confirmation packet (e.g., acknowledgment or block acknowledgment) associated with a second device indicating that the second device intends to make an upstream communication, the first device may perform a back off as a function of the priority of information that the first device would like to transmit upstream. In an embodiment where the upstream confirmation packet (e.g., acknowledgment or block acknowledgment) associated with the second device also includes information by which a priority may be associated with the upstream communication to be made by the second device, the first device may perform a back off as a function of the relative priority of information that the first device would like to transmit in comparison to a priority of information that the second device would like to transmit. That is to say, the relative priorities of upstream transmissions to be made from both the first and the second device may be employed in calculating the particular characteristics of such a back off as may be performed by the first device to allow the upstream transmission of the second device.

Figure 7:
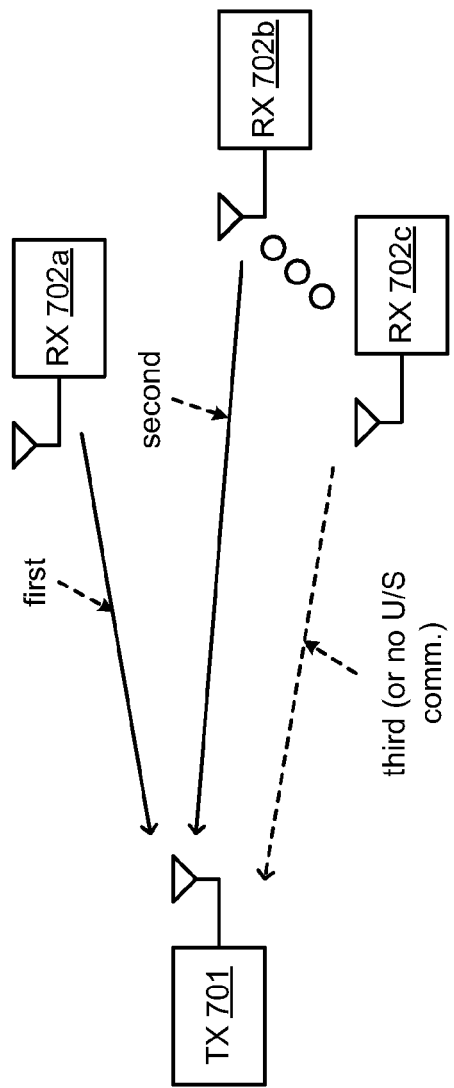
FIG. 7 is a diagram illustrating an embodiment of scheduled upstream (U/S) communications from a number of receiver wireless communication devices to a transmitter wireless communication device.

FIG. 7 is a diagram illustrating an embodiment 700 of scheduled upstream (U/S) communications from a number of receiver wireless communication devices to a transmitter wireless communication device.

As may be seen with respect to this diagram, the device 701 is operative to stay off of the communication medium (e.g., the air) for a particular period of time (e.g., such as may be determined in accordance with an appropriately determined back off), and during this time in which the device 701 is off of the communication medium, one or more of the devices 702a-702c that intends or needs to make an upstream communication to the device 701 compete for access to the communication medium. In one embodiment, the respective devices 702a-702c compete for access to the communication medium in accordance with carrier sense multiple access/collision avoidance (CSMA/CA).

In addition, in another possible embodiment, not only do the respective devices 702a-702c compete for access to the communication medium in accordance with CSMA/CA, but the particular CSMA/CA as performed by the respective devices 702a-702c is made based upon the respective priorities of the various upstream communications to be made from the respective devices 702a-702c. That is to say, such a particular CSMA/CA may be performed that considers the respective priorities of the various upstream communications to be made from the respective devices 702a-702c. As depicted in this diagram, a first upstream communication is firstly made from device 702a, and a second upstream communication is secondly made from device 702b. In some situations, the device 702c does have an upstream communication to be made, and such upstream communication may be thirdly made. In other situations, the device 702c does not have an upstream communication to be made. Generally speaking, based upon a prioritization among the respective upstream communications to be made from the respective devices 702a-702c (e.g., as determined by the device 701 or in accordance with a modified CSMA/CA is operative to consider prioritization among the respective upstream communications), those upstream communications are made from the respective devices 702a-702c to the device 701 appropriately.

With respect to this diagram as well as other embodiments described herein, it is noted that not all receiver wireless communication devices will always have an upstream communication to be made to a transmitter wireless communication device. In such instances, the contention free upstream communications will be made based upon a methodology or approach that includes only those receiver wireless communication devices that intend or need to make a respective upstream communication.

FIG. 8 is a diagram illustrating an embodiment 800 of scheduled upstream (U/S) communications from a number of receiver wireless communication devices to a transmitter wireless communication device in accordance with polling, management, or control as initiated by the transmitter wireless communication device.

As may be seen with respect to this diagram, a particular schedule is provided from the device 801 to the respective devices 802a-802c indicating an order by which respective upstream communications may be made from the respective devices 802a-802c to the device 801. In such an embodiment, the device 801 is operative to prioritize the respective upstream communications based upon information provided within one or more respective acknowledgments or block acknowledgments provided from one or more of the devices 802a-802c. Such an implementation may be viewed as being a transmitter-centric implementation in which the device 801 is that device which analyzes such information provided within one or more respective acknowledgments or block acknowledgments and determines the order in which respective upstream communications are to be provided to the device 801. Such a schedule may be provided in accordance with any of a variety of downstream communications (e.g., a poll frame, a management frame, a control frame, and/or any other type of downstream communication, etc.).

After the schedule has been transmitted from the device 801 to the respective devices 802a-802c (e.g., at or during a time 1), those respective devices 802a-802c then make their respective upstream communications to the device 801 in accordance with the provided schedule. Specifically with respect to this diagram, device 802a firstly makes its respective upstream communication to the device 801, device 802c secondly makes its respective upstream communication to the device 801, and so on until device 802b makes its respective upstream communication to the device 801 at a time x. In the embodiment related to the diagram, since it is a transmitter-centric implementation in which the device 801 is that device which provides the schedule by which respective upstream communications are to be made from the respective devices 802a-802c, the device 801 will stay off of the communication medium for an appropriate period of time to allow those respective upstream communications to be made. The period of time may be based upon an appropriately selected back off that is a function of the amount of upstream communications that need to be made. For example, a relatively longer back off would be employed for relatively more upstream communications, and a relatively shorter back off may be employed for relatively fewer upstream communications.

In addition, the schedule as provided from the 801 may provide information beyond merely the order by which the respective devices 802a-802c are to make their respective upstream communications. The schedule may also include respective time durations by which each of the respective devices 802a-802c may make their respective upstream communications. Specificity may be also included within the schedule to indicate a respective number of packets that each respective one of the devices 802a-802c is allowed to make within an upstream transmission. Again, given that such an embodiment is a transmitter-centric implementation, the device 801 may have access to and receive a number of types of information which will allow for any desired degree of granularity in determining not only a particular order by which the respective devices 802a-802c are to make their respective upstream communications, but also provide for controlling any number of constraints and/or parameters by which those respective upstream communications are to be made.

With respect to various embodiments disclosed herein including those of FIG. 7 and FIG. 8 describing various operations and functionality of what a TX may do to effectuate subsequent upstream communications from one or more RXs (e.g., to effectuate those subsequent, non-confirmation packet upstream communications), there are a variety of actions that the TX make. For example, in one embodiment, the TX may operate in accordance with a passive mode of operation in which it ceases any communications and stays off of the communication medium/stays off of the air.

In accordance with some predetermined or predefined protocol, the TX may alternatively provide instruction that indicates to one or more RXs that they may go ahead and perform their respective communication; such an implementation may be viewed as being a "go-ahead" packet provided from the TX to one or more RXs. For example, the TX may provide indication to the one or more RXs that they may go ahead and compete for communication medium access, such as in accordance with CSMA/CA. In other words, the TX may provide such a "go-ahead" packet that indicates to the one or more RXs that they may go ahead and effectuate their respective upstream communications in accordance with some predetermined or predefined protocol. In certain embodiments, operation in accordance with this mode of operation may be viewed as precipitating communications which may be effectuated in accordance with a contention based (CB) mode of operation (e.g., such as one in which the various RXs compete for communication medium access). Alternatively, operation in accordance with this mode of operation may be viewed as precipitating communications in accordance with some predetermined or predefined protocol. For example, one or more of the respective communication devices within the network may include a number of different predetermined or predefined protocols, and a communication from the TX to the one or more RXs may be made in accordance with this selected or indicated one of those predetermined or predefined protocols; the instruction provided from the TX the one or more RXs may itself include indication of which one of the predetermined or predefined protocols is to be employed by the one or more RXs.

And yet another embodiment, the TX may provide very specific instructions to the respective RXs detailing particularly the manner in which each should perform its respective upstream communications. For example, in such an embodiment, the TX provides very specific and detailed instruction to the one or more RXs regarding the manner in which they are to make their respective communications. In certain embodiments, operation in accordance with this mode of operation may be viewed as directing communications in accordance with a contention free (CF) mode of operation. That is to say, the TX provides the necessary information to direct the timing, channels, order, communication type, etc. and/or any combination thereof by which the one or more RXs are to effectuate their upstream communications to the TX. From certain perspectives, the TX may be viewed as providing a control packet to the one or more RXs to control virtually all of the characteristics, operational parameters, etc. by which the one or more RXs are to effectuate their upstream communications to the TX.

Generally speaking, as may be understood, there are at least three alternative modes of operation or at least three layers of operation in accordance with various aspects, and their equivalents, of the invention. Moreover, each respective layer of operation/mode of operation may be particularly adapted, tailored, and tweaked for use within a particular application.

FIG. 9 is a diagram illustrating an embodiment 900 of scheduled upstream (U/S) communications from a number of receiver wireless communication devices to a transmitter wireless communication device based on coordination among the receiver wireless communication devices and prioritization of the respective content to be transmitted by the receiver wireless communication devices. As may be seen with respect to this diagram, at or during a first time, a number of devices 902a-902c operate cooperatively with each other to determine some priority scheme by which they may make upstream communications to device 901. In certain embodiments, the priority scheme is based upon the type of content each of the devices 902a-902c intends or wishes to make to the device 901. As shown particularly within the diagram, device 902a includes video content information, device 902b includes voice content information, and device 902c includes data content information. Considering one possible prioritization scheme in which video is provided a relatively higher priority than voice and data, and voice is provided a relatively higher priority than data, and data is provided a relatively lower priority than both video and voice, then video content information should be firstly transmitted from device 902a (e.g., at or during a time 1), voice content information should be secondly transmitted from 902b (e.g., at or during a time 2), and data content information should be transmitted at or during a time x that is after the time 1 and the time 2.

As may be understood with respect to this diagram, the prioritization among which upstream communications are to be performed and the ordering by which such upstream communications are to be performed is made cooperatively among the respective devices 902a-902c without necessarily being directed by the device 901. Such an implementation of this diagram is a receiver-centric implementation and differs from that of the previous embodiment in which such prioritization is made in a transmitter-centric manner.

With respect to such an embodiment in which prioritization is made among the respective devices 902a-902c without necessarily being directed by the device 901, such application will work well when each of the respective devices 902a-902c are operative to listen in on and hear the respective communications provided from all of the other of the respective devices 902a-902c. That is to say, within certain applications in which each of the respective devices 902a-902c can in fact communicate with, listen to, etc. each of the other respective devices 902a-902c, such receiver-centric operations they be performed such that coordination among the respective devices 902a-902c may be achieved. However, other wireless communication system applications, such as wireless local area network (WLAN) applications, do not necessarily provide such capabilities. For example, within a WLAN, the access point (AP) typically can communicate with, listen to, etc. all of the wireless stations (STAs) within the WLAN, each of the respective STAs may not necessarily be able to communicate with, listen to, etc. all of the other STAs within the WLAN.

FIG. 10A, FIG. 10B, FIG. 11A, FIG. 11B, FIG. 12A, and FIG. 12B illustrate various embodiment of methods as may be performed in accordance with operation of various devices such as various wireless communication devices.

Figure 10B:
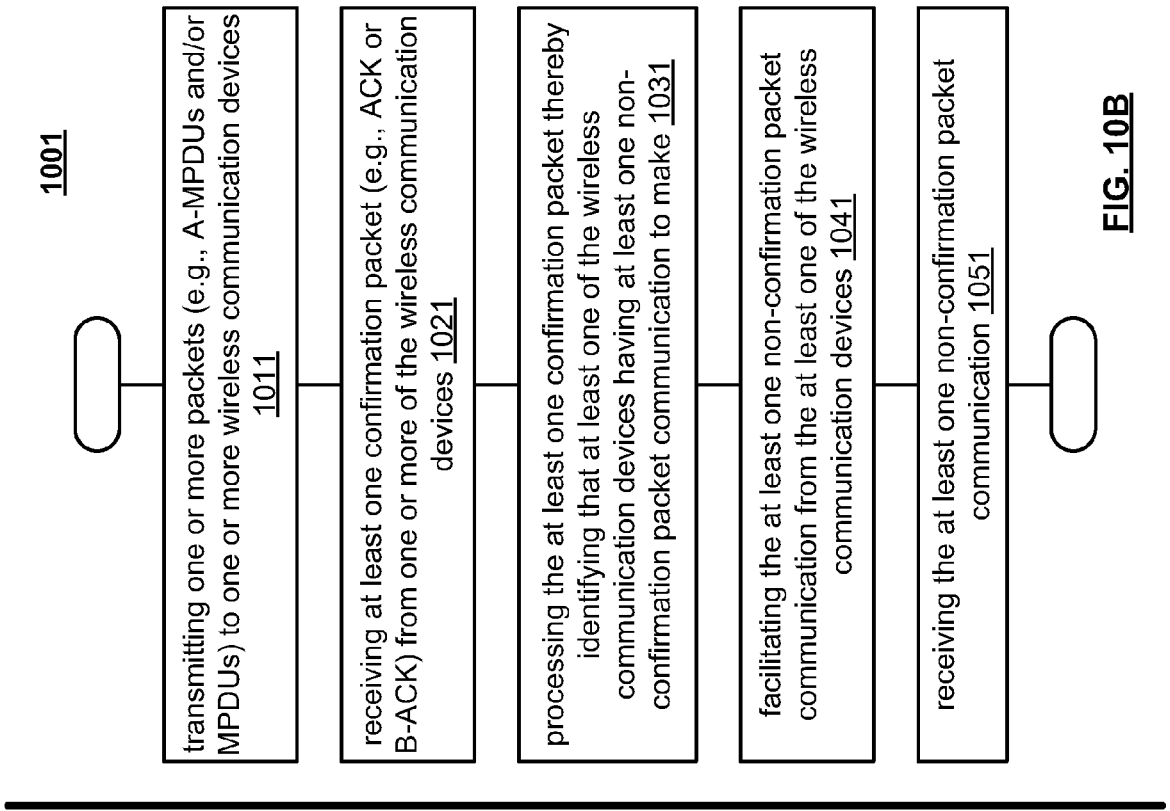
Figure 10A:
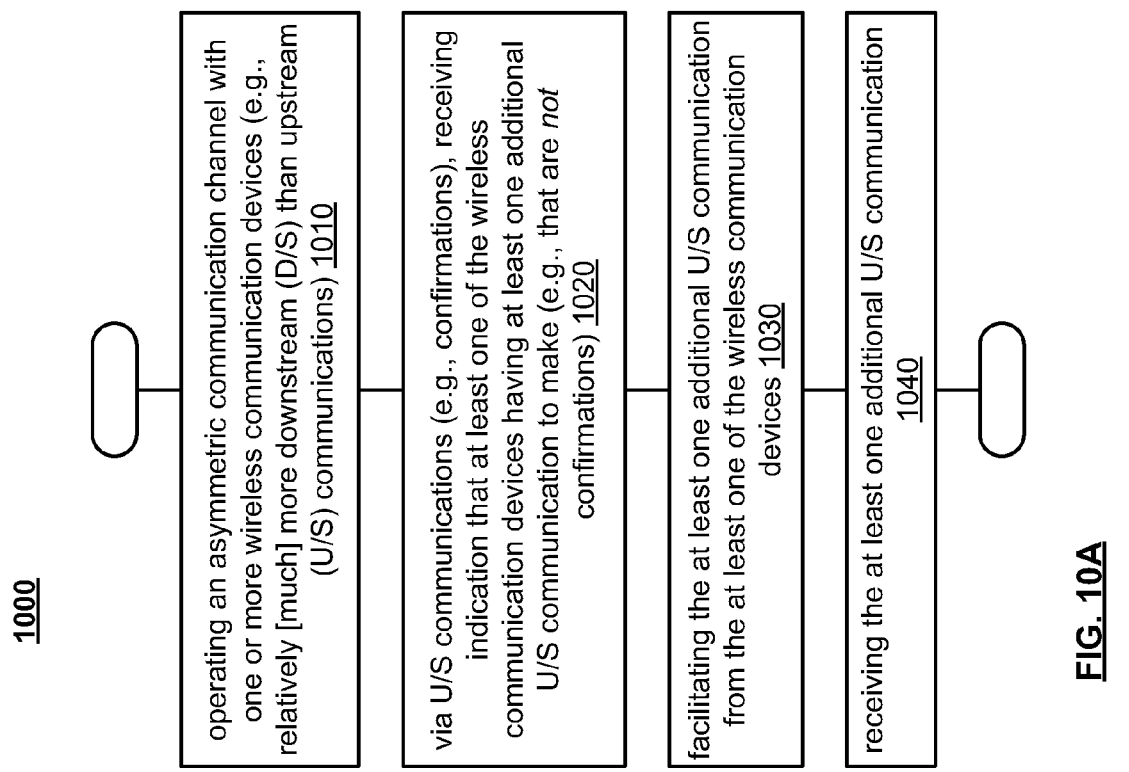

Referring to method 1000 of FIG. 10A, the method 1000 begins by operating an asymmetric a communication channel with one or more wireless communication devices, as shown in a block 1010. That is to say, with respect to downstream and upstream communications within such a communication channel, there may be relatively much more downstream communications than upstream communications, hence the characterization of an asymmetric communication channel.

Via upstream communications, the method 1000 continues by receiving indication that at least one of the wireless communication devices having at least one additional upstream communication to make, as shown in a block 1020. That is to say, in accordance with such an asymmetric communication channel, a majority of the communications therein may be downstream. While upstream communications are made regularly within certain communication system applications (e.g., confirmation packets in response to downstream communications, which may be ACKs, B-ACKs, etc.), only occasionally will there be any subsequent upstream communications made (e.g., that are not confirmation packets, ACKs, B-ACKs, etc.).

The method 1000 then operates by facilitating the at least one additional upstream communication from the at least one of the wireless communication devices, as shown in a block 1030. The method 1000 continues by receiving the at least one additional option communication, as shown in a block 1040.

Referring to method 1001 of FIG. 10B, the method 1001 begins by transmitting one or more packets to one or more wireless communication devices, as shown in a block 1011. Such packets may be implemented in a variety of ways, including (e.g., aggregated MAC (media access control) data protocol unit (A-MPDUs) and/or MAC (media access control) data protocol units (MPDUs)). Alternatively, such downstream communications may be effectuated in accordance with RTS/CTS exchanges.

The method 1001 then operates by receiving at least one upstream confirmation packet (e.g., ACK or B-ACK, CTS, etc.) from one or more of the wireless communication devices, as shown in a block 1021.

The method 1001 continues by processing the at least one upstream confirmation packet (e.g., acknowledgment or block acknowledgment) thereby identifying that at least one of the wireless communication devices having at least one non-acknowledgment communication to make, as shown in a block 1031. That is to say, the operation of the block 1031 is operative to determine that a subsequent at least one upstream communication to be made by at least one of the wireless communication devices is not particularly an upstream confirmation packet (e.g., acknowledgment or a block acknowledgment). For example, in certain embodiments, such an upstream communication may be data, video, etc. and/or any other type of upstream communication that is not specifically an upstream confirmation packet (e.g., acknowledgment or a block acknowledgment).

The method 1001 then operates by facilitating the at least one non-acknowledgment communication from the at least one of the wireless communication devices, as shown in a block 1041. The method 1000 then operates by receiving the at least one non-confirmation packet communication (e.g., a communication that is not an ACK, B-ACK, CTS, etc.), as shown in a block 1051.

Figure 11B:
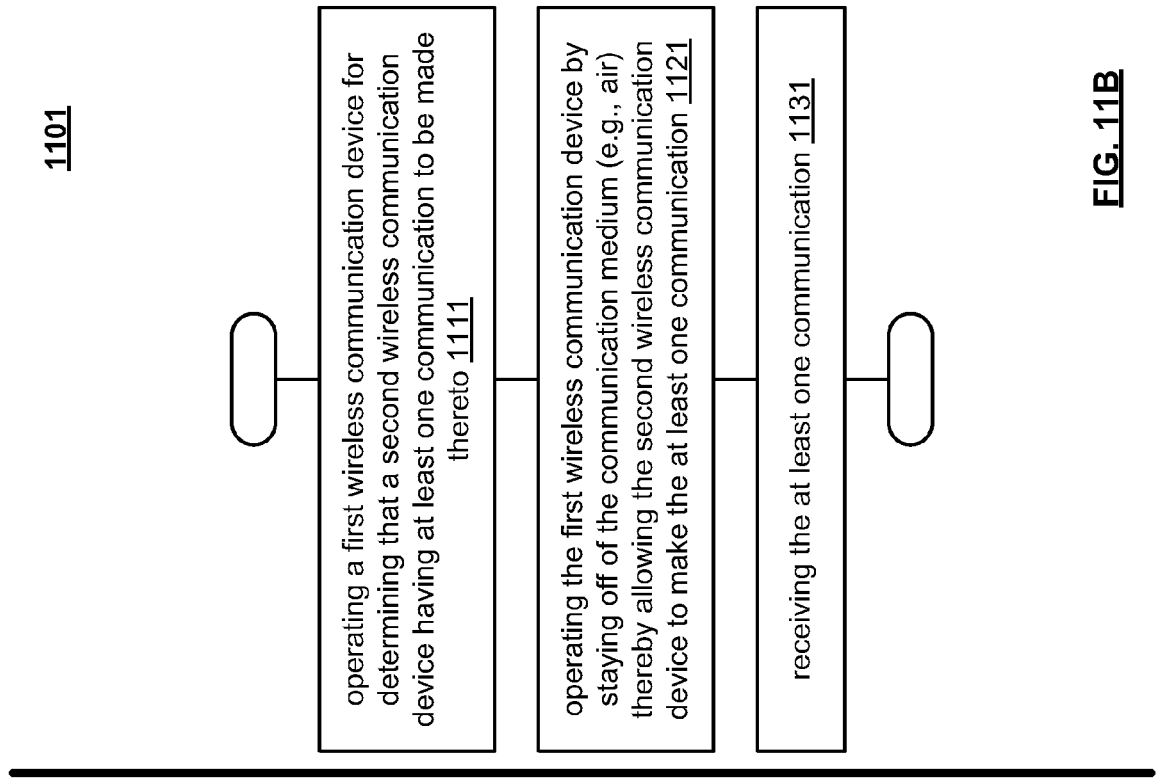
Figure 11A:
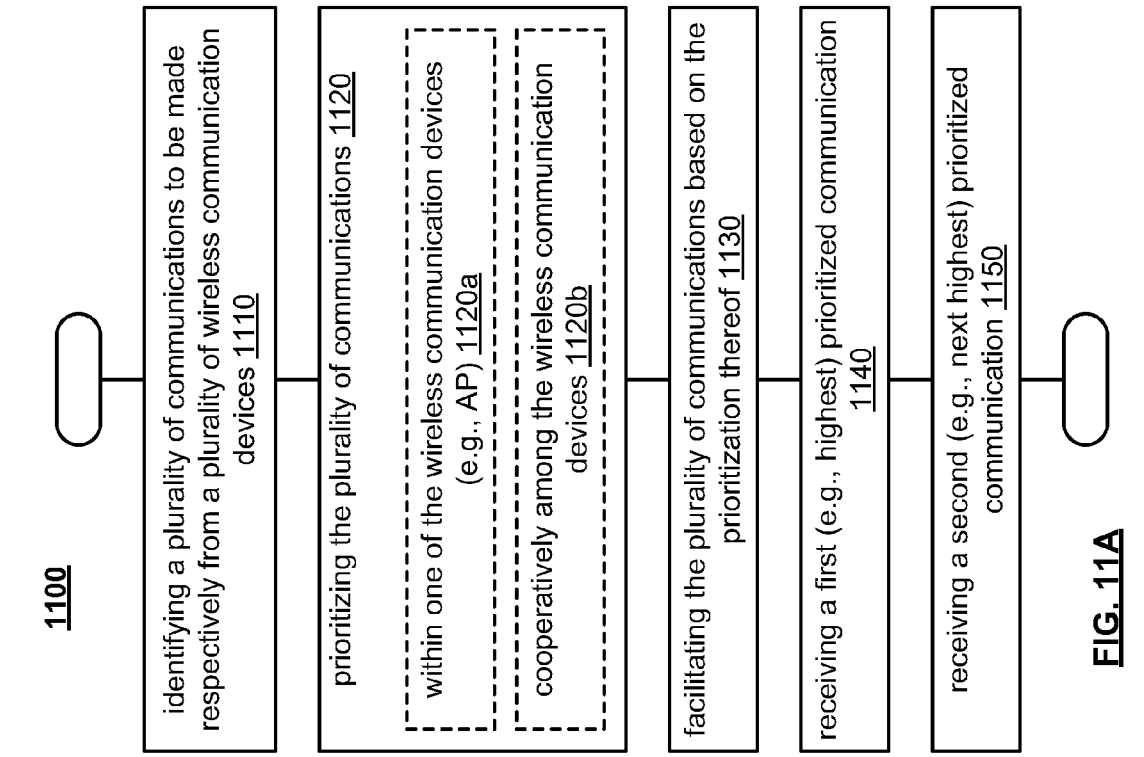

Referring to method 1100 of FIG. 11A, the method 1100 begins by identifying a plurality of communications to be made respectively from a plurality of wireless communication devices, as shown in a block 1110.

The method 1100 continues by prioritizing the plurality of communications, as shown in a block 1120.

In certain embodiments, the operation of the block 1120 operates in accordance with the prioritization be performed within one of the wireless communication devices (e.g., an access point (AP) within a wireless local area network (WLAN)), as shown in a block 1120a. In certain other embodiments or in addition to such embodiments operations in accordance with that of the block 1120a, the operation of the block 1120 operates in accordance with more than one of the wireless communication devices operating cooperatively to perform such prioritization, as shown in a block 1120b.

The method 1100 then operates by facilitating the plurality of communications based on the prioritization thereof, as shown in a block 1130.

The method 1100 continues by receiving a first prioritized communication, as shown in a block 1140. In certain embodiments, the first prioritized communication is the highest prioritized communication. The method 1100 then operates by receiving a second prioritized communication, as shown in a block 1150. In certain embodiments, the second prioritized communication is the next highest prioritized communication. The method 1100 may continue to operate by receiving each of the subsequently prioritized communications in order.

Referring to method 1101 of FIG. 11B, the method 1101 begins by operating a first wireless communication device for determining that a second wireless communication device having at least one communication to be made thereto, as shown in a block 1111.

The method 1101 then operates by operating the first wireless communication device by staying off of the communication medium (e.g., the air) thereby allowing the second wireless communication device to make the at least one communication, as shown in a block 1121. In certain, the time period during which the first wireless communication device stays off the communication medium corresponds to that determined by back off which is performed by the first wireless communication device.

The method 1101 continues by receiving the at least one communication, as shown in a block 1131.

Figure 12B:
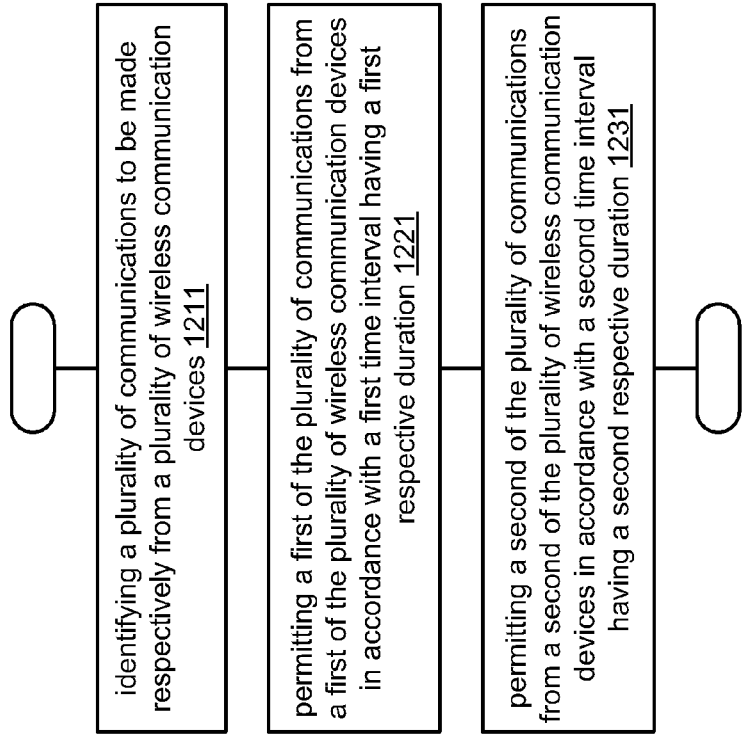
Figure 12A:
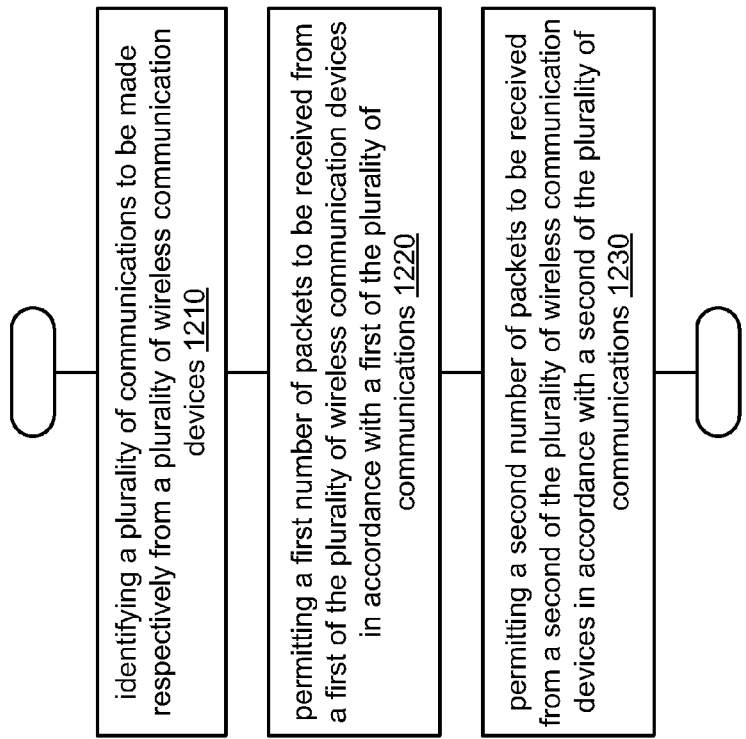

Referring to method 1200 of FIG. 12A, the method 1200 begins by identifying a plurality of communications to be made respectively from a plurality of wireless communication devices, as shown in a block 1210.

The method 1200 continues by permitting a first number of packets to be received from a first of the plurality of wireless communication devices in accordance with a first of the plurality of communications, as shown in a block 1220.

The method 1200 then operates by permitting a second number of packets to be received from a second of the plurality of wireless communication devices in accordance with a second of the plurality of communications, as shown in a block 1230.

Referring to method 1201 of FIG. 12B, the method 1201 begins by identifying a plurality of communications to be made respectively from a plurality of wireless communication devices, as shown in a block 1211.

The method 1201 then operates by permitting a first of the plurality of communications from a first of the plurality of wireless communication devices in accordance with a first time interval having a first respective duration, as shown in a block 1221.

The method 1201 continues by permitting a second of the plurality of communications from a second of the plurality of wireless communication devices in accordance with a second time interval having a second respective duration, as shown in a block 1231.

It is also noted that the various operations and functions as described with respect to various methods herein may be performed within a wireless communication device, such as using a baseband processing module implemented therein (e.g., such as in accordance with the baseband processing module as described with reference to FIG. 2) and/or other components therein. For example, such a baseband processing module can perform various operations and processes in accordance with various aspects of the invention, and/or any other operations and functions as described herein, etc. or their respective equivalents.

It is noted that the various modules and/or circuitries (baseband processing modules and/or circuitries, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |

TABLE 2-continued

Channelization for Table 1

| Channel | Frequency (MHz) |
|---|---|
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |

TABLE 7-continued

Channelization for Table 6

| Channel | Frequency (MHz) |
|---|---|
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modu-lation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. An apparatus comprising:
a radio for:
 transmitting at least one communication to a plurality of wireless communication devices via at least one of a plurality of communication channels; and
 receiving from at least one of the plurality of wireless communication devices via the at least one of a plurality of communication channels at least one confirmation communication with appended indicator and type of at least one impending non-confirmation communication; and a processing module for processing the at least one confirmation communication thereby identifying at least one of the plurality of wireless communication devices having the at least one impending non-confirmation communication for transmission to the apparatus;
and wherein:
the apparatus facilitates the at least one of the plurality of wireless communication devices transmitting the at least one impending non-confirmation communication thereto.

2. The apparatus of claim 1, wherein:
the at least one communication includes at least one of an aggregated MAC (media access control) data protocol unit (A-MPDU) and a MAC (media access control) data protocol unit (MPDU); and
the at least one confirmation communication includes at least one of an acknowledgement (ACK) and a block acknowledgement (B-ACK).

3. The apparatus of claim 1, wherein:
the at least one communication includes at least one request to send (RTS) communication; and
the at least one confirmation communication includes at least one clear to send (CTS) communication.

4. The apparatus of claim 1, wherein:
directionality from the apparatus to the plurality of wireless communication devices corresponds to downstream; and
directionality from the plurality of wireless communication devices to the apparatus corresponds to upstream; and
downstream communications from the apparatus to the plurality of wireless communication devices are asymmetrical such that they are relatively greater in number than upstream communications from the plurality of wireless communication devices to the apparatus.

5. The apparatus of claim 1, wherein:
the at least one confirmation communication further includes an appended identifier identifying at least one characteristic associated with the at least one impending non-confirmation communication.

6. The apparatus of claim 1, wherein:
the apparatus is operative for ceasing any or all communication via the plurality of communication channels for facilitating the at least one of the plurality of wireless communication devices transmitting the at least one impending non-confirmation communication thereto.

7. The apparatus of claim 1, wherein:
the apparatus transmits a schedule to the plurality of wireless communication devices for facilitating the at least one of the plurality of wireless communication devices transmitting the at least one impending non-confirmation communication thereto.

8. The apparatus of claim 1, wherein:
the apparatus is operative for transmitting a schedule to the plurality of wireless communication devices for facilitating a plurality of wireless communication devices transmitting a plurality of the at least one impending non-confirmation communications thereto;
the schedule based on respective priorities associated with the plurality of impending non-confirmation communications;
the schedule directing a first of the plurality of wireless communication devices for transmitting a first of the plurality of impending non-confirmation communications to the apparatus at a first time;
the schedule directing a second of the plurality of wireless communication devices for transmitting a second of the plurality of impending non-confirmation communications to the apparatus at a second time; and
the first of the plurality of impending non-confirmation communications having relatively higher priority than the second of the plurality of impending non-confirmation communications.

9. The apparatus of claim 1, wherein:
the apparatus comprises an access point (AP); and
the plurality of wireless communication devices comprises a plurality of wireless stations (STAs).

10. An apparatus comprising:
a radio for:
transmitting downstream a plurality of communications to a plurality of wireless communication devices via at least one of a plurality of communication channels; and
receiving at least one upstream confirmation communication from at least one of the plurality of wireless communication devices via the at least one of the plurality of communication channels or at least one additional communication channel, the confirmation communication including at least an appended indicator and type of at least one subsequent upstream communication; and
a processing module for processing the at least one confirmation communication thereby identifying at least one of the plurality of wireless communication devices having the at least one subsequent upstream communication for transmission to the apparatus; and
wherein:
the apparatus facilitates the at least one of the plurality of wireless communication devices transmitting the at least one subsequent upstream communication thereto.

11. The apparatus of claim 10, wherein:
the plurality of communications includes at least one of an aggregated MAC (media access control) data protocol unit (A-MPDU) and a MAC (media access control) data protocol unit (MPDU); and
the at least one confirmation communication includes at least one of an acknowledgement (ACK) and a block acknowledgement (B-ACK).

12. The apparatus of claim 10, wherein:
the plurality of communications includes at least one request to send (RTS) communication; and
the at least one confirmation communication including at least one clear to send (CTS) communication.

13. The apparatus of claim 10, wherein:
the at least one subsequent upstream communication comprises a non-confirmation communication.

14. The apparatus of claim 10, wherein:
directionality from the apparatus to the plurality of wireless communication devices corresponds to the downstream; and
directionality from the plurality of wireless communication devices to the apparatus corresponds to the upstream; and
downstream communications from the apparatus to the plurality of wireless communication devices are relatively greater in number than upstream communications from the plurality of wireless communication devices to the apparatus.

15. The apparatus of claim 10, wherein:
the confirmation communication further includes appended characteristic data and the processing module operative for processing the at least one confirmation communication thereby identifying at least one characteristic associated with the at least one subsequent upstream communication for transmission to the apparatus.

16. The apparatus of claim 10, wherein:
the apparatus is operative for transmitting a schedule to the plurality of wireless communication devices for facilitating the at least one of the plurality of wireless communication devices transmitting the at least one subsequent upstream communication thereto.

17. The apparatus of claim 10, wherein:
the apparatus operative for transmitting a schedule to the plurality of wireless communication devices facilitates a plurality of wireless communication devices transmitting a plurality of upstream non-confirmation communications thereto;
the schedule based on respective priorities associated with the plurality of non-confirmation communications;
the schedule directing a first of the plurality of wireless communication devices for transmitting a first of the plurality of non-confirmation communications to the apparatus at a first time;
the schedule directing a second of the plurality of wireless communication devices for transmitting a second of the plurality of non-confirmation communications to the apparatus at a second time; and
the first of the plurality of non-confirmation communications having relatively higher priority than the second of the plurality of non-confirmation communications.

18. A method for operating a wireless communication device, the method comprising:
operating a radio for transmitting a plurality of communications via at least one of a plurality of communication channels;
operating the radio for detecting at least one confirmation communication with appended indication of at least one impending communication from another wireless communication device via the at least one of the plurality of communication channels or at least one additional communication channel;
processing the at least one confirmation communication thereby identifying at least the another wireless communication device having the at least one impending communication for transmission to the wireless communication device; and
facilitating the another wireless communication device transmitting the at least one impending communication.

19. The method of claim 18 further comprising:
processing the at least one confirmation communication thereby identifying at least one characteristic associated with the at least one impending communication for transmission to a wireless communication access point.

20. The method of claim 18 further comprising:
the radio ceasing any or all communications via the plurality of communication channels for facilitating the another wireless communication devices transmitting the at least one impending communication.

* * * * *